(12) United States Patent
Suto

(10) Patent No.: US 11,294,487 B2
(45) Date of Patent: Apr. 5, 2022

(54) PRESSING OPERATION DETECTION DEVICE AND METHOD FOR DETECTING PRESSING OPERATION

(71) Applicant: ALPINE ELECTRONICS, INC., Tokyo (JP)

(72) Inventor: Shunichi Suto, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 8 days.

(21) Appl. No.: 16/896,710

(22) Filed: Jun. 9, 2020

(65) Prior Publication Data

US 2020/0387252 A1    Dec. 10, 2020

(30) Foreign Application Priority Data

Jun. 10, 2019  (JP) .............................. JP2019-108091

(51) Int. Cl.
*G06F 3/041*    (2006.01)

(52) U.S. Cl.
CPC .......... *G06F 3/0412* (2013.01); *G06F 3/0414* (2013.01); *G06F 2203/04105* (2013.01)

(58) Field of Classification Search
None
See application file for complete search history.

(56) References Cited

U.S. PATENT DOCUMENTS

| 2012/0026110 | A1* | 2/2012 | Yamano | G06F 3/0418 |
| | | | | 345/173 |
| 2014/0085244 | A1 | 3/2014 | Nishigai et al. | |
| 2015/0301684 | A1* | 10/2015 | Shimamura | G06F 3/04186 |
| | | | | 345/174 |

FOREIGN PATENT DOCUMENTS

| JP | 2013-012186 | 1/2013 |
| JP | 2016-131014 | 7/2016 |

* cited by examiner

*Primary Examiner* — Brian M Butcher
(74) *Attorney, Agent, or Firm* — Crowell & Moring LLP

(57) ABSTRACT

The present invention includes a touch time detection unit detecting a touch time on an operation unit and a determination controller changing content of a determination process to be performed by a pressing operation determination unit based on the touch time. Content of the determination process to be performed by the pressing operation determination unit based on a pressing amount is changed such that the ease of detection of a pressing operation when a pressing amount is instantaneously changed in a short period of time is changed based on a touch time so that false detection of a pressing operation caused by an instantaneous change of a pressing amount due to noise in a pressing operation of gradually increasing pressure is avoided and a case where a pressing operation of performing a strong press in a short period of time is not detected is avoided.

9 Claims, 6 Drawing Sheets

PRESSING OPERATION DETECTION DEVICE AND METHOD FOR DETECTING PRESSING OPERATION

RELATED APPLICATION

The present application claims priority to Japanese Patent Application Number 2019-108091, filed Jun. 10, 2019, the entirety of which is hereby incorporated by reference.

BACKGROUND

1. Field of the Invention

The present invention relates to a pressing operation detection device and a method for detecting a pressing operation, and in particular, the present invention is suitably applied to a pressing operation detection device configured to detect a pressing operation in accordance with a touch on an operation unit and a pressing amount.

2. Description of the Related Art

In general, when a user operates a graphical user interface (GUI) displayed on a display including a touch panel, a pressing amount is detected in addition to a touch on the touch panel, and it is determined that the GUI has been pressed when the pressing amount exceeds a threshold value. Since a detection of a pressing amount is additionally used for a determination as to whether a pressing operation has been performed, a reliable pressing operation may be obtained by the user.

When the user operates the touch panel, a pressing amount detected by a sensor may be instantaneously increased due to electromagnetic noise or external vibration noise. When the pressing amount which is instantaneously increased due to generation of noise exceeds a threshold value, it is mistakenly determined that a pressing operation has been performed although an amount of pressing performed by the user does not actually reach the threshold value. In general, to avoid this problem, a low pass filter (LPF), such as a moving average filter (MAF), is provided to perform moving average on pressing amounts successively detected by the sensor for smoothing so that an adverse effect of the noise is reduced.

FIG. 6 is a diagram schematically illustrating occurrence of false detection of a pressing operation caused by noise and a countermeasure using an MAF. In FIG. 6, an axis of abscissae denotes an elapsed time and an axis of ordinates denotes a pressing amount. In FIG. 6, a state in which pressure is gradually increased after a pressing operation is started on the touch panel is illustrated. For simplicity of description, it is assumed that the user increases pressure at a constant rate with time (a pressing amount is increased at a constant rate).

In the example of FIG. 6, noise is generated twice while a pressing amount is gradually increased as the user gradually increases pressure on the touch panel. When the moving average process is not performed by the MAF, a pressing amount which is instantaneously increased due to the noise generated the second time exceeds a threshold value, and therefore, it is mistakenly determined that a pressing operation is performed at this time point. On the other hand, when the moving average process is performed, a pressing amount which is smoothed by the moving average does not exceed the threshold value even when a detection value of a pressing amount instantaneously becomes larger than the threshold value due to the noise generated the second time, and therefore the false detection of determining that the pressing operation is performed at this time point may be avoided.

Note that Japanese Unexamined Patent Application Publication No. 2016-131014 discloses a touch operation detection apparatus which avoids false detection of a touch operation caused by noise. Specifically, the touch operation detection apparatus disclosed in Japanese Unexamined Patent Application Publication No. 2016-131014 detects a touch on an operation surface as a touch operation when a moving distance and a touch load which are detected in a touch position on the touch panel satisfy a predetermined relationship. In this method, when noise or the like is detected, a moving distance and a touch load do not satisfy the predetermined relationship, and therefore a touch operation is not mistakenly detected.

Furthermore, an electronic apparatus having a plurality of threshold values set for performing a predetermined process and capable of detecting pressure on a touch panel in a number of stages has been used, and in the electronic apparatus, the plurality of threshold values are set such that differences between the threshold values are successively reduced as a pressing amount is increased (refer to Japanese Unexamined Patent Application Publication No. 2013-12186, for example). In this way, a burden given to the user until pressure in upper stages is detected may be reduced and occurrence of an erroneous operation in which pressure is instantaneously detected in a plurality of stages when the user only lightly touches the touch panel in an unintentional manner may be avoided.

As described above, by obtaining a moving average of pressing amounts successively detected by the sensor, even when an output value of the sensor is instantaneously increased to exceed the threshold value due to noise, false detection of mistakenly determining that a pressing operation is performed at this time point may be avoided. However, as illustrated in FIG. 7, in a case where the user performs an operation of strongly pressing the touch panel in a comparatively short period of time (a so-called "tap operation"), even when a pressing amount output from the sensor is larger than the threshold value, a pressing amount obtained by the moving average process does not exceed the threshold value, and therefore, there arises a problem in that a tap operation is not detected.

SUMMARY

The present disclosure is made to address such a problem and an object of the present disclosure is to avoid false detection of a pressing operation caused by an instantaneous change of a pressing amount due to noise when a pressing operation of gradually increasing pressure in a comparatively long period of time is performed and to avoid a case where a pressing operation is not detected when a pressing operation of performing a strong press in a comparatively short period of time is performed.

A determination process of easily detecting a pressing operation in response to an instantaneous change of a pressing amount in a short period of time or a determination process of not easily detecting a pressing operation in response to an instantaneous change of a pressing amount may be selected in accordance with a touch time of touching on the operation unit performed by the user. This way, according to the present disclosure, false detection of a pressing operation caused by an instantaneous change of a pressing amount due to noise when a pressing operation of gradually increasing pressure for a comparatively long period of time is performed may be avoided, and a case where a pressing operation is not detected when a pressing operation of performing a strong press in a comparatively short period of time is performed may be avoided.

DETAILED DESCRIPTION OF THE PREFERRED EMBODIMENTS

Figure 1:
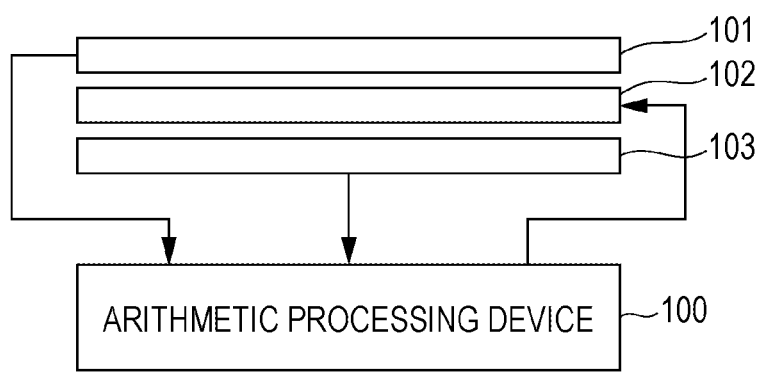
FIG. 1 is a diagram schematically illustrating an example of a configuration of an in-vehicle apparatus including a pressing operation detection device according to an embodiment.

Hereinafter, an embodiment of the present invention will be described with reference to the accompanying drawings. FIG. 1 is a diagram schematically illustrating an example of a configuration of an in-vehicle apparatus including a pressing operation detection device according to an embodiment. As illustrated in FIG. 1, the in-vehicle apparatus includes an arithmetic processing device 100 including a pressing operation detection device according to this embodiment, a touch panel 101, a display panel 102, and a pressure detection sensor 103.

The touch panel 101 corresponding to an operation unit according to an aspect of the disclosure detects a position touched by a user in a vehicle and outputs touch position information indicating the touched position. The display panel 102 displays an image generated by the arithmetic processing device 100 and is constituted by a liquid crystal panel or an organic electroluminescence (EL) panel, for example. The pressure detection sensor 103 detects pressure when the user presses the touch panel 101 and outputs pressing amount information indicating a pressing amount changed in accordance with the pressure.

As illustrated in FIG. 1, the touch panel 101 is disposed on an uppermost layer, the display panel 102 is disposed on a layer beneath the touch panel 101, and the pressure detection sensor 103 is disposed on a layer beneath the display panel 102. When the user lightly touches a desired position on the touch panel 101, the touch panel 101 detects the touched position. Furthermore, when the user strongly touches (presses) a desired position on the touch panel 101, pressure of the touch is transmitted from the touch panel 101 through the display panel 102 to the pressure detection sensor 103 so that the touch panel 101 detects the touched position and the pressure detection sensor 103 detects the pressure (a pressing amount).

Note that configurations and arrangement of the touch panel 101, the display panel 102, and the pressure detection sensor 103 are merely examples and the present invention is not limited to these. For example, the display panel 102 may be configured slightly smaller than the touch panel 101, and the pressure detection sensor 103 and the touch panel 101 and the pressure detection sensor 103 are coupled to each other outside the display panel 102 so that pressure of pressing on the touch panel 101 performed by the user is directly transmitted from the touch panel 101 to the pressure detection sensor 103 without using the display panel 102.

Information on the touched position detected by the touch panel 101 and information on the pressing amount detected by the pressure detection sensor 103 are supplied to the arithmetic processing device 100. The arithmetic processing device 100 determines whether a pressing operation has been performed based on the touch position information supplied from the touch panel 101 and the pressing amount information supplied from the pressure detection sensor 103, and executes a predetermined process in accordance with content of a GUI displayed in the touched position when determining that the pressing operation has been performed.

Figure 2:
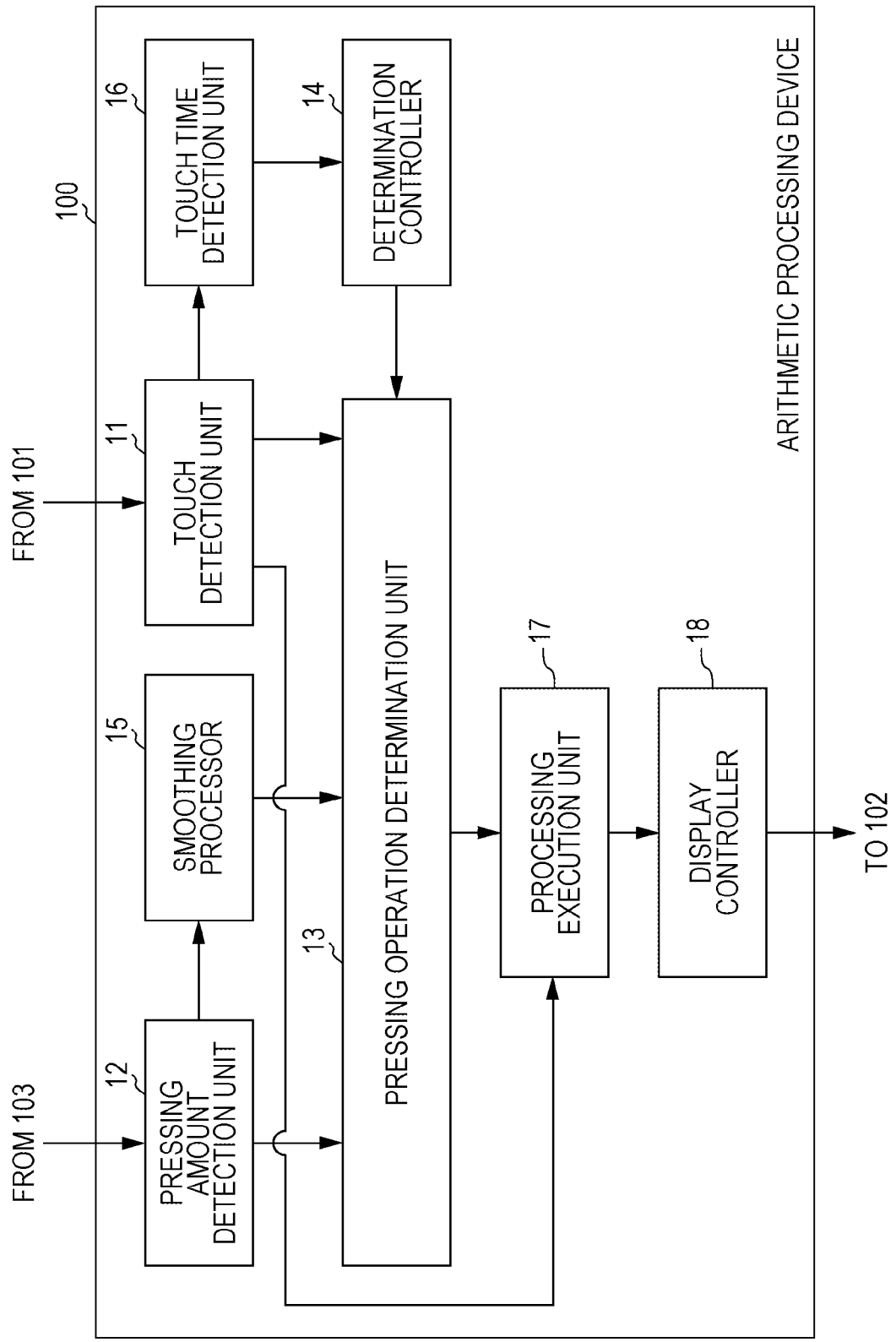
FIG. 2 is a block diagram illustrating an example of a functional configuration of an arithmetic processing device including the pressing operation detection device according to the embodiment.

FIG. 2 is a block diagram illustrating an example of a functional configuration of the arithmetic processing device 100 including the pressing operation detection device according to the embodiment. As illustrated in FIG. 2, the arithmetic processing device 100 according to this embodiment includes, as functional configurations thereof, a touch detection unit 11, a pressing amount detection unit 12, a pressing operation determination unit 13, a determination controller 14, a smoothing processor 15, a touch time detection unit 16, a processing execution unit 17, and a display controller 18. In these configurations, the touch detection unit 11, the pressing amount detection unit 12, the pressing operation determination unit 13, the determination controller 14, the smoothing processor 15, and the touch time detection unit 16 constitute the pressing operation detection device according to this embodiment.

The functional blocks 11 to 18 may be configured by hardware, a digital signal processor (DSP), or software. When each of the functional blocks 11 to 18 is configured by software, each of the functional blocks 11 to 18 includes a central processing unit (CPU), a random access memory (RAM), and a read only memory (ROM) of a computer in practice and is realized when a program stored in a recording medium, such as the RAM, the ROM, a hard disk, or a semiconductor memory, is operated.

The touch detection unit 11 detects a touch on the touch panel 101 by the user based on touch position information supplied from the touch panel 101. Furthermore, the touch detection unit 11 also detects a touched position on the touch panel 101 based on the touch position information supplied from the touch panel 101. Information indicating that the touch panel 101 is touched or not touched is used by the pressing operation determination unit 13 and the touch time detection unit 16, and information on the touched position is used by the processing execution unit 17.

The pressing amount detection unit 12 successively detects amounts of pressing on the touch panel 101 performed by the user based on the pressing amount information supplied from the pressure detection sensor 103. The information on the pressing amounts on the touch panel 101 is used by the pressing operation determination unit 13.

The smoothing processor 15 performs a process of smoothing pressing amounts successively detected by the pressing amount detection unit 12. The smoothing process is performed to remove noise which considerably changes a value of pressure detected by the pressure detection sensor 103 in an instantaneous manner, and is performed by an MAF, for example. Specifically, the smoothing processor 15 reduces an adverse effect of noise by performing a moving average process on the pressing amounts successively detected by the pressing amount detection unit 12. Note that the MAF is an example of the smoothing process and the smoothing process is not limited to this. For example, a LPF process other than the MAF may be performed.

The touch time detection unit 16 detects an elapsed time in which a touch is continued from when the user starts touching on the touch panel 101 (hereinafter referred to as a "touch time") based on the touch position information supplied from the touch panel 101. Specifically, the touch time detection unit 16 has a timer function, starts a counting operation of a timer when supply of the touch position information is started by the touch panel 101, and stops the counting operation of the timer when the supply of the touch position information from the touch panel 101 is terminated. A detected touch time is gradually increased in a period of time from the start of the counting operation of the timer to the termination of the counting operation of the timer.

The pressing operation determination unit 13 determines whether the pressing operation has been performed on the touch panel 101 based on a touch performed on the touch panel 101 detected by the touch detection unit 11 and an amount of pressing on the touch panel 101 detected by the pressing amount detection unit 12 or a pressing amount smoothed by the smoothing processor 15. The term "pressing operation" includes, in addition to a light touch on the touch panel 101, an operation of strongly pressing the touch panel 101 until a pressing amount set as a threshold value is reached. Specifically, the pressing operation determination unit 13 determines whether the pressing operation has been performed on the touch panel 101 based on a detection of a touch on the touch panel 101 performed by the touch detection unit 11 and a determination as to whether a pressing amount output from the pressing amount detection unit 12 or the smoothing processor 15 has reached the threshold value.

The determination controller 14 changes, in accordance with a touch time detected by the touch time detection unit 16, content of a determination process to be performed by the pressing operation determination unit 13 such that the ease of detection of a pressing operation when a pressing amount is instantaneously changed in a short period of time is changed. Specifically, the determination controller 14 changes content of the determination process to be performed by the pressing operation determination unit 13 such that, when a touch time detected by the touch time detection unit 16 is longer than a predetermined value (that is, when the counting operation performed by the timer is continued longer than a period of time indicated by the predetermined value), the determination as to whether the pressing operation has been performed is made using a pressing amount subjected to the smoothing process performed by the smoothing processor 15 whereas when the touch time is not longer than the predetermined value, the determination as to whether the pressing operation has been performed is made using a pressing amount detected by the pressing amount detection unit 12.

Accordingly, when the touch time of touching on the touch panel 101 is longer than the predetermined value (that is, when a detection of a touch on the touch panel 101 by the touch detection unit 11 is continued until the touch time reaches the predetermined value), the pressing operation determination unit 13 determines whether the pressing operation has performed based on a result of a determination as to whether a pressing amount subjected to the smoothing process performed by the smoothing processor 15 reaches the threshold value. On the other hand, when the touch time of touching on the touch panel 101 is not longer than the predetermined value, it is determined whether the pressing operation has been performed based on a result of a determination as to whether a pressing amount detected by the pressing amount detection unit 12 reaches the threshold value.

Note that the pressing operation determination unit 13 determines whether a pressing operation has been performed using a pressing amount detected by the pressing amount detection unit 12 (a pressing amount which has not been smoothed by the smoothing processor 15) in an initial state. When the touch time detected by the touch time detection unit 16 is longer than the predetermined value after a touch on the touch panel 101 is detected by the touch detection unit 11, content of the determination process is changed such that the determination as to whether the pressing operation has been performed is made based on the pressing amount smoothed by the smoothing processor 15 under control of the determination controller 14.

In general, a case where a touch on the touch panel 101 by the user is continued until the touch time reaches the predetermined value corresponds to a state in which the user performs a pressing operation such that pressure is gradually applied to the touch panel 101 for a comparatively long period of time. Therefore, in this case, the determination controller 14 controls the pressing operation determination unit 13 such that the determination as to whether a pressing operation has been performed is made using a pressing amount smoothed by the smoothing processor 15 so that a pressing operation is not easily detected in response to an instantaneous change of a pressing amount generated by noise.

On the other hand, a case where a touch on the touch panel 101 by the user is terminated before the touch time reaches the predetermined value corresponds to a state in which the user performs an operation of strongly pressing the touch panel 101 in a comparatively short period of time (a so-called tap operation). Therefore, in this case, the determination controller 14 controls the pressing operation determination unit 13 such that the pressing operation determination unit 13 determines whether a pressing operation has been performed using a pressing amount detected by the pressing amount detection unit 12 (a pressing amount which is not smoothed by the smoothing processor 15) so that a pressing operation is easily detected when a pressing amount is changed in a short period of time.

The predetermined value of the touch time to be used as a reference of the determination for changing the content of the determination process to be performed by the pressing operation determination unit 13 is appropriately set in advance based on information obtained as a trial in terms of an approximate standard value of a touch time from a start of a touch on the touch panel 101 to an end of the touch in the tap operation in which a pressing amount exceeds the threshold value in a short period of time.

When the pressing operation determination unit 13 determines that the pressing operation has been performed on the touch panel 101, the processing execution unit 17 executes a predetermined process corresponding to a GUI displayed at a touched position on the touch panel 101. The display controller 18 performs control such that an image generated by the processing execution unit 17 is displayed on the display panel 102 based on a result of the predetermined process performed by the processing execution unit 17. By this, an image displayed on the display panel 102 is changed in accordance with the pressing operation performed on the touch panel 101.

Figure 3A:
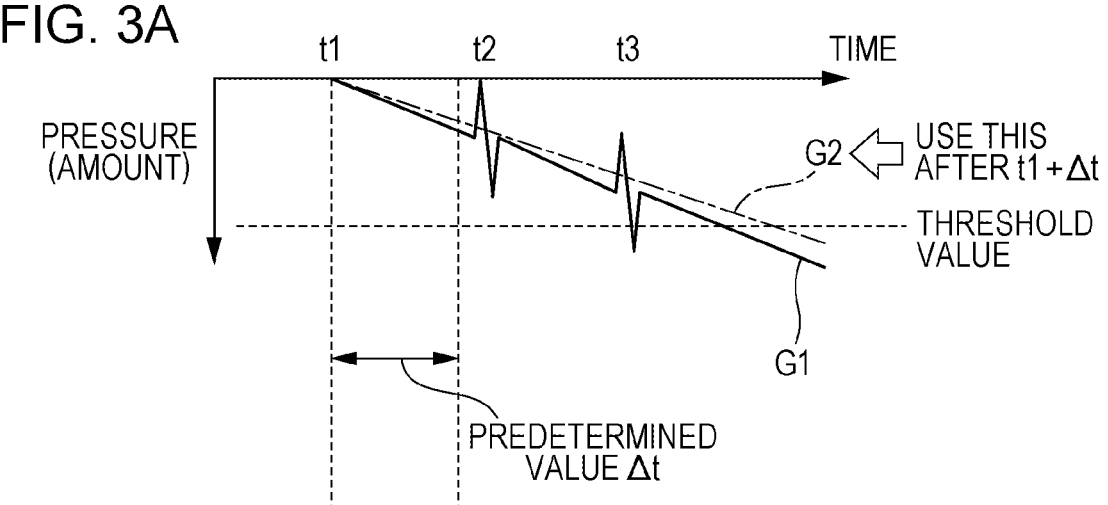
FIGS. 3A and 3B are diagrams schematically illustrating an example of an operation of detecting a pressing operation performed by the pressing operation detection device according to the embodiment.
Figure 3B:
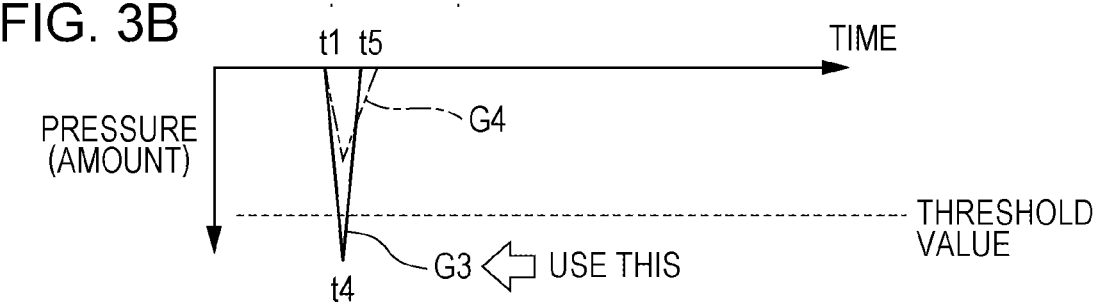

FIGS. 3A and 3B are diagrams schematically illustrating an example of an operation of detecting a pressing operation performed by the pressing operation detection device according to the embodiment. FIG. 3A is a diagram illustrating an operation performed when a pressing operation is performed such that a touch time of touching on the touch panel 101 is longer than the predetermined value, and FIG. 3B is a diagram illustrating an operation performed when a pressing operation (a tap operation) is performed such that a touch time of touching on the touch panel 101 is shorter than the predetermined value. In FIGS. 3A and 3B, axes of abscissae denote an elapsed time and axes of ordinates denote a pressing amount.

FIG. 3A is a diagram illustrating a state in which a touch on the touch panel 101 is started at a time point t1 and pressure is gradually increased. For simplicity of description, as indicated by a graph G1, it is assumed that the user increases pressure at a constant rate with time (a pressing amount is increased at a constant rate). A graph G2 schematically indicates a result of a moving average calculation performed by the smoothing processor 15 on pressing amounts successively detected by the pressing amount detection unit 12 as indicated by the graph G1.

In the example of FIG. 3A, a touch time of touching on the touch panel 101 counted from the time point t1 continues over a predetermined value Δt. While the user gradually increases the pressure on the touch panel 101 so that the pressing amount is gradually increased, noise is generated at time points t2 and t3. As illustrated in FIG. 3A, when a touch time of touching on the touch panel 101 is longer than the predetermined value Δt, the process of determining whether a pressing operation has been performed is made by the pressing operation determination unit 13 after the touch time exceeds the predetermined value Δt based on the graph G2 (the pressing amount smoothed by the smoothing processor 15) instead of the graph G1 (the pressing amount detected by the pressing amount detection unit 12). Therefore, even when a detection value of the pressing amount instantaneously becomes larger than the threshold value due to the second noise generated at the time point t3, the smoothed pressing amount does not exceed the threshold value, and therefore, false determination of determining that the pressing operation has been performed at the time point t3 may be avoided.

Note that, while the user performs a pressing operation such that pressure applied on the touch panel 101 is gradually increased, before the touch time exceeds the predetermined value Δt, a process of determining whether a pressing operation has been performed is performed by the pressing operation determination unit 13 based on the pressing amount detected by the pressing amount detection unit 12 indicated by the graph G1. Here, even when noise is generated before the touch time exceeds the predetermined value Δt and the pressing amount detected by the pressing amount detection unit 12 is instantaneously changed, the pressing amount rarely exceeds the threshold value. Therefore, at a time point before the touch time exceeds the predetermined value Δt, an erroneous determination of a pressing operation due to noise is rarely performed.

On the other hand, FIG. 3B is a diagram illustrating a state in which a touch on the touch panel 101 is started at the time point t1, pressure is increased to exceed the threshold value in a short period of time, a peak is generated at a time point t4, the pressure is reduced, and the touch on the touch panel 101 is not detected at a time point t5. A graph G3 schematically indicates the series of changes in the pressing amount detected by the pressing amount detection unit 12. A graph G4 schematically indicates a result of a moving average calculation performed by the smoothing processor 15 on pressing amounts successively detected by the pressing amount detection unit 12 as indicated by the graph G3.

In the example of FIG. 3B, a touch on the touch panel 101 is not detected before the touch time of the touching on the touch panel 101 counted from the time point t1 reaches the predetermined value. Therefore, the pressing operation determination process is performed by the pressing operation determination unit 13 based on the graph G3 (the pressing amount detected by the pressing amount detection unit 12) instead of the graph G4 (the pressing amount smoothed by the smoothing processor 15). Accordingly, even when the smoothed pressing amount does not exceed the threshold value, the pressing amount which is not smoothed exceeds the threshold value, and accordingly, a pressing operation (a tap operation) may be detected.

Figure 4:
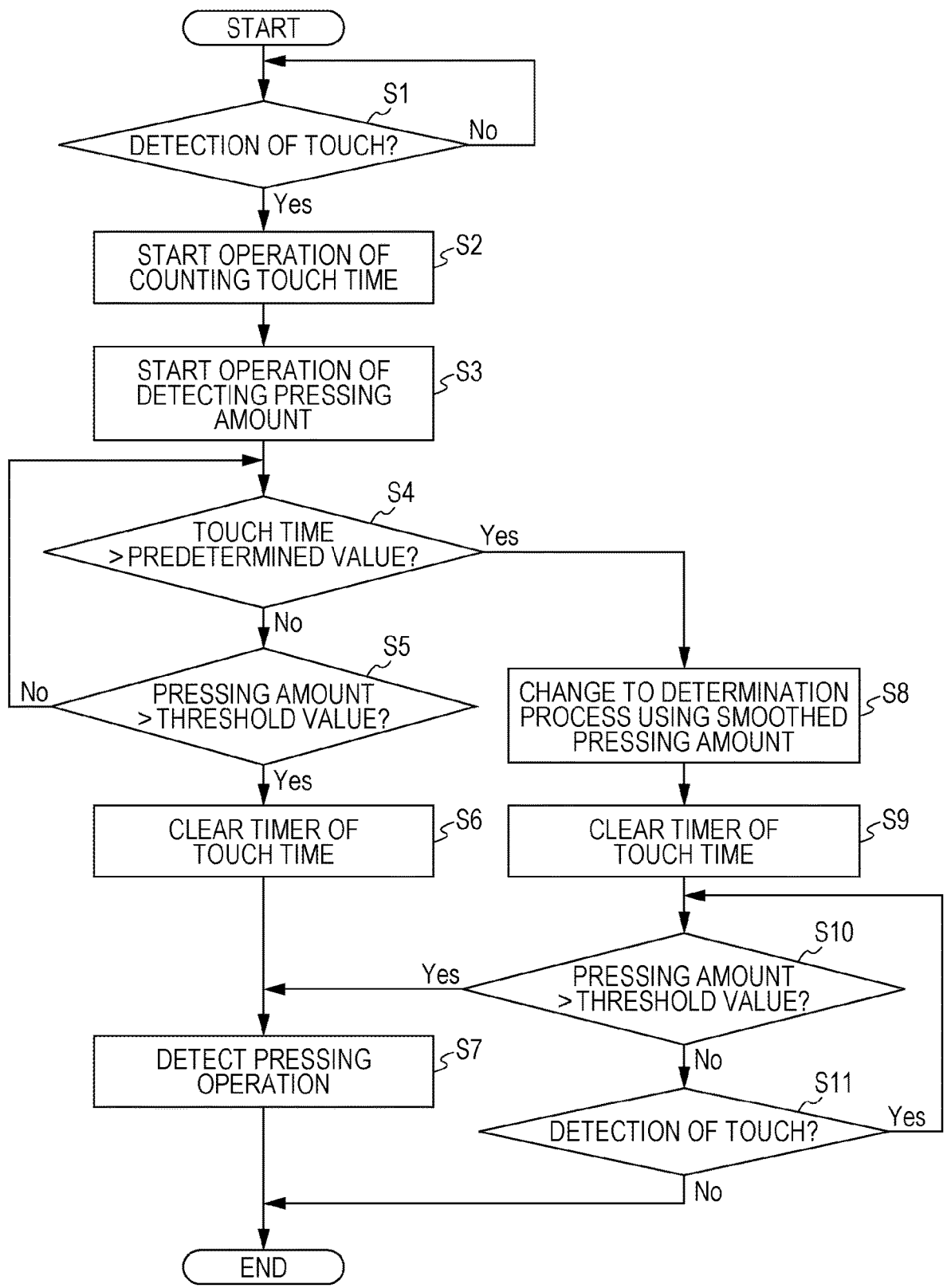
FIG. 4 is a flowchart of an example of an operation performed by the pressing operation detection device according to the embodiment.

FIG. 4 is a flowchart of an example of an operation performed by the pressing operation detection device configured as described above. The flowchart illustrated in FIG. 4 is started when the in-vehicle apparatus is powered. Note that the pressing operation determination unit 13 is set so as to determine whether a pressing operation has been performed using a pressing amount detected by the pressing amount detection unit 12 in an initial state immediately after the power-on.

First, the touch detection unit 11 determines whether a touch on the touch panel 101 by the user is detected based on presence or absence of touch position information supplied from the touch panel 101 (step S1). When a touch on the touch panel 101 is not detected, the determination in step S1 is repeatedly performed. When a touch on the touch panel 101 is detected, the touch time detection unit 16 starts an operation of counting a touch time using a timer (step S2). Furthermore, the pressing amount detection unit 12 starts an operation of detecting an amount of pressing on the touch panel 101 (step S3).

Then the determination controller 14 determines whether the touch time detected by the touch time detection unit 16 is longer than the predetermined value (step S4). When the touch time is not longer than the predetermined value, the pressing operation determination unit 13 determines whether a pressing amount detected by the pressing amount detection unit 12 is larger than the threshold value (step S5). When the pressing amount is not larger than the threshold value, the process returns to step S4 and the operation of counting the touch time and the operation of detecting the pressing amount are continuously performed.

On the other hand, when the pressing operation determination unit 13 determines that the amount of pressing on the touch panel 101 is larger than the threshold value, the touch time detection unit 16 clears the timer (step S6) after stopping the operation of counting the touch time and the pressing operation determination unit 13 detects a pressing operation (step S7). In this case, the pressing operation determination unit 13 detects a tap operation performed such that a pressing amount reaches the threshold value in a period of time in which the touch time of the touching on the touch panel 101 is shorter than the predetermined value, and then, the process in the flowchart of FIG. 4 is terminated.

In step S4, when determining that the touch time of touching on the touch panel 101 is longer than the predetermined value, the determination controller 14 changes content of the determination process to be performed by the pressing operation determination unit 13 such that a determination as to whether a pressing operation has been performed is made using a pressing amount smoothed by the smoothing processor 15 (step S8). Furthermore, the touch time detection unit 16 stops the counting operation of the touch time and clears the timer (step S9).

Thereafter, the pressing operation determination unit 13 determines whether a pressing amount detected by the pressing amount detection unit 12 is larger than the threshold value (step S10). When the pressing operation determination unit 13 determines that the amount of pressing on the touch panel 101 is larger than the threshold value, the pressing operation determination unit 13 detects a pressing operation (step S7). In this case, the pressing operation determination unit 13 detects a pressing operation performed such that a pressing amount reaches the threshold value after the pressure on the touch panel 101 is gradually increased and the touch time exceeds the predetermined value, and the process of the flowchart in FIG. 4 is terminated in response to the detection.

On the other hand, when the pressing operation determination unit 13 determines that the amount of pressing on the touch panel 101 is not larger than the threshold value, the touch detection unit 11 determines whether the touch on the touch panel 101 is still detected (step S11). When the touch on the touch panel 101 is still detected by the touch detection unit 11, the process returns to step S10 where the operation of detecting a pressing amount is continuously performed. On the other hand, when the touch on the touch panel 101 is no longer detected by the touch detection unit 11, the pressing operation determination unit 13 does not detect a pressing operation and the process of the flowchart in FIG. 4 is terminated.

As described above in detail, in this embodiment, when the determination as to whether a pressing operation has been performed on the touch panel 101 is made based on a touch on the touch panel 101 performed by the user and a pressing amount, the content of the determination process based on the pressing amount to be performed by the pressing operation determination unit 13 is changed such that the ease of detection of a pressing operation when a pressing amount is instantaneously changed in a short period of time is changed (a determination process based on a pressing amount detected by the pressing amount detection unit 12 or a determination process based on a pressing amount smoothed by the smoothing processor 15).

With this configuration of this embodiment, when a pressing operation is performed such that pressure is gradually increased for a comparatively long time, the determination process based on a pressing amount smoothed by the smoothing processor 15 is performed, so that false detection of a pressing operation caused by an instantaneous change of a pressing amount due to noise may be avoided. Furthermore, since the determination process is performed based on a pressing amount detected by the pressing amount detection unit 12 when a pressing operation is performed such that a strong press is performed in a comparatively short period of time, a miss of detection of a pressing operation may be avoided.

Note that the content of the control performed by the determination controller 14 described in the foregoing embodiment is merely an example and the present invention is not limited to this. For example, the determination controller 14 sets a first threshold value for the pressing operation determination unit 13 when the touch time detected by the touch time detection unit 16 is longer than the predetermined value and sets a second threshold value smaller than the first threshold value for the pressing operation determination unit 13 when the touch time is not longer than the predetermined value, so that content of the determination process to be performed by the pressing operation determination unit 13 is changed.

In this case, the pressing operation determination unit 13 performs a determination process based on a pressing amount smoothed by the smoothing processor 15 when either of the threshold values is used. Specifically, the pressing operation determination unit 13 determines whether a pressing operation has been performed based on a result of a determination as to whether a pressing amount smoothed by the smoothing processor 15 reaches the first threshold value when a touch time of touching on the touch panel 101 is longer than the predetermined value. On the other hand, when the touch time of touching on the touch panel 101 is not longer than the predetermined value, the pressing operation determination unit 13 determines whether a pressing operation has been performed based on a result of a determination as to whether a pressing amount smoothed by the smoothing processor 15 reaches the second threshold value.

Here, the pressing operation determination unit 13 determines whether a pressing operation has been performed using the second threshold value in the initial state. When the touch time detected by the touch time detection unit 16 is longer than the predetermined value after a touch on the touch panel 101 is detected by the touch detection unit 11, content of the determination process is changed such that the pressing operation is determined using the first threshold value instead of the second threshold value under control of the determination controller 14.

Figure 5A:
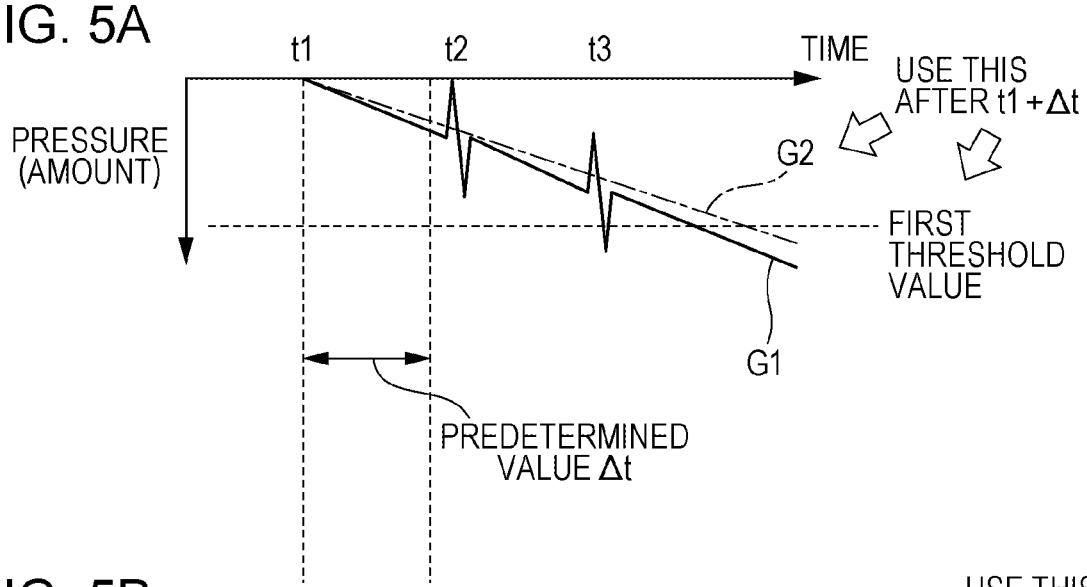
FIGS. 5A and 5B are diagrams schematically illustrating an example of another operation of detecting a pressing operation performed by the pressing operation detection device according to the embodiment.
Figure 5B:
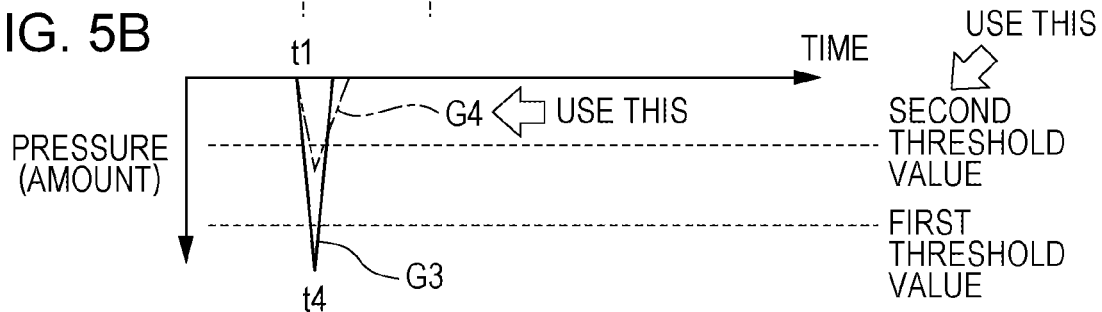
Figure 6:
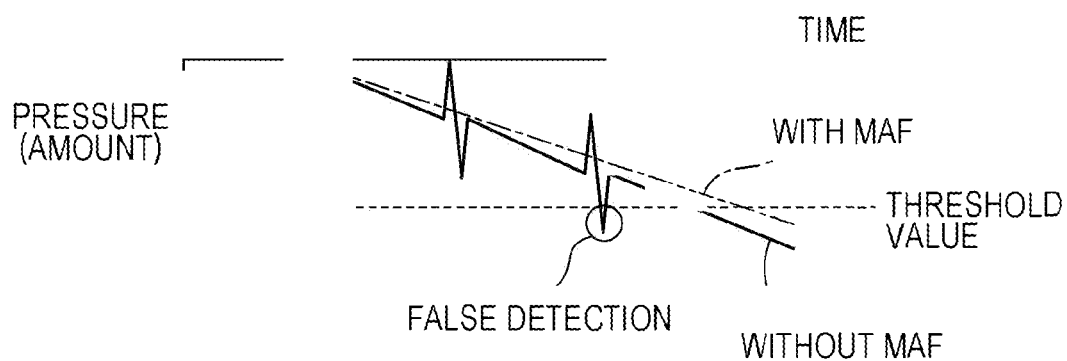
FIG. 6 is a diagram schematically illustrating occurrence of false detection of a pressing operation due to noise and a countermeasure.
Figure 7:
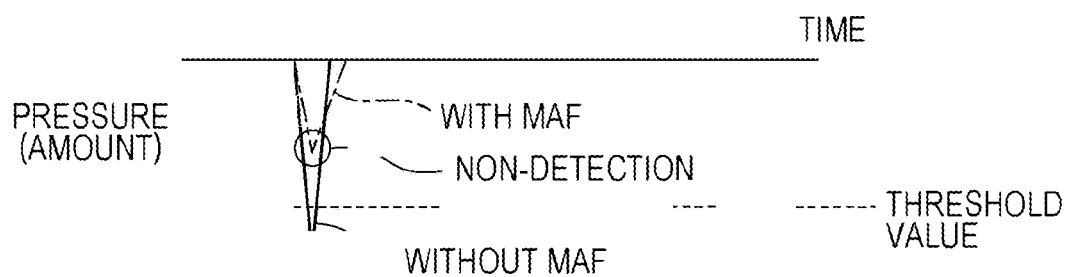
FIG. 7 is a diagram illustrating a problem which arises in a general detection of a tap operation.

FIGS. 5A and 5B are diagrams schematically illustrating an example of an operation of detecting a pressing operation when a threshold value of the pressing operation determination unit 13 is changed. FIG. 5A is a diagram illustrating an operation performed when a pressing operation is performed such that a touch time of touching on the touch panel 101 is longer than the predetermined value, and FIG. 5B is a diagram illustrating an operation performed when a pressing operation (a tap operation) is performed such that a touch time of touching on the touch panel 101 is shorter than the predetermined value. The first threshold value illustrated in FIG. 5A is equal to the threshold value illustrated in the example of FIG. 3A. Therefore, the operation illustrated in FIG. 5A is the same as the operation content illustrated in FIG. 3A.

In FIG. 5B, a graph G3 indicating a change of a pressing amount detected by the pressing amount detection unit 12 and a graph G4 indicating a change of a pressing amount smoothed by the smoothing processor 15 are the same as those illustrated in FIG. 3B. FIG. 5B is different from FIG. 3B in a second threshold value which is smaller than a first threshold value. In the example of FIG. 3B, the pressing operation determination unit 13 determines whether a pressing operation has been performed based on a result of a determination as to whether a pressing amount detected by the pressing amount detection unit 12 is larger than the first threshold value as indicated by the graph G3.

On the other hand, in the example of FIG. 5B, the pressing operation determination unit 13 determines whether a pressing operation has been performed based on a result of a determination as to whether a pressing amount smoothed by the smoothing processor 15 is larger than the second threshold value as indicated by the graph G4. In this case, the pressing amount smoothed by the smoothing processor 15 does not exceed the first threshold value but exceeds the second threshold value, and therefore, a pressing operation (a tap operation) may be detected.

Note that the pressing operation determination unit 13 may determine whether a pressing operation has been performed based on a result of a determination as to whether a pressing amount smoothed by the smoothing processor 15 reaches the first threshold value when the touch time of touching on the touch panel 101 is longer than the predetermined value, and on the other hand, the pressing operation determination unit 13 may determine whether a pressing operation has been performed based on a result of a determination as to whether a pressing amount detected by the pressing amount detection unit 12 (a pressing amount not smoothed by the smoothing processor 15) reaches the second threshold value when the touch time of touching on the touch panel 101 is not longer than the threshold value. Note that it is possible that a pressing amount which is instantaneously increased due to noise exceeds the second threshold value, and therefore, a pressing amount smoothed by the smoothing processor 15 is preferably used.

Although the touch panel 101 is used as an example of an operation unit in the foregoing embodiment, the present invention is not limited to this. For example, a button of hardware which is mechanically configured may be used as the operation unit.

Furthermore, although the threshold values (the first and second threshold values) used for the determination as to whether a pressing operation has been performed are absolute values in the foregoing embodiment, the present invention is not limited to this. For example, in a case where a pressing detection structure including the touch panel 101 and the pressure detection sensor 103 is mounted on a vehicle, depending on arrangement of the pressing detection structure disposed on a dashboard or the like, the pressure detection sensor 103 may detect pressure due to vibration of the vehicle or the pressure detection sensor 103 may detect pressure when the user presses a surrounding portion of the touch panel 101 except for the touch panel 101. Specifically, the pressure detection sensor 103 may detect pressure although the touch panel 101 does not detect a touch. In this case, pressure (a pressing amount) detected by the pressure detection sensor 103 when the touch panel 101 does not detect a touch is used as a reference and a relative value relative to the reference may be set as a threshold value.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A pressing operation detection device including a touch detection unit detecting a touch on an operation unit performed by a user and a pressing amount detection unit detecting a pressing amount of pressing on the operation unit performed by the user, the pressing operation detection device comprising:
    a smoothing processing unit configured to perform a smoothing process on pressing amounts successively detected by the pressing amount detection unit;
    a pressing operation determination unit configured to determine whether a pressing operation has been performed on the operation unit based on a touch on the operation unit and a pressing amount;
    a touch time detection unit configured to detect a touch time which is an elapsed time in which a touch on the operation unit by the user is continued from start of the touch; and
    a determination controller configured to change content of the determination process to be performed by the pressing operation determination unit;
    wherein the determination controller changes content of the determination process to be performed by the pressing operation determination unit such that the determination as to whether a pressing operation has been performed is made using a pressing amount smoothed by the smoothing processing unit when the touch time detected by the touch time detection unit is longer than a predetermined value, whereas the determination as to whether a pressing operation has been performed is made using a pressing amount detected by the pressing amount detection unit when the touch time is not longer than the predetermined value, and
    wherein the pressing operation determination unit determines whether a pressing operation has been performed based on a result of a determination as to whether a pressing amount smoothed by the smoothing processing unit reaches a threshold value when the touch time is longer than the predetermined value, whereas the pressing operation determination unit determines whether a pressing operation has been performed based on a result of a determination as to whether a pressing amount detected by the pressing amount detection unit reaches the threshold value when the touch time is not longer than the predetermined value.

2. The pressing operation determination device according to claim 1,
    wherein the determination controller sets a first threshold value for the pressing operation determination unit when the touch time detected by the touch time detection unit is longer than a predetermined value and sets a second threshold value which is smaller than the first threshold value for the pressing operation determination unit when the touch time is not longer than the predetermined value, so as to change content of a determination process to be performed by the pressing operation determination unit, and
    wherein the pressing operation determination unit determines whether a pressing operation has been performed based on a result of a determination as to whether a pressing amount smoothed by the smoothing processing unit reaches the first threshold value when the touch time is longer than the predetermined value and determines whether a pressing operation has been performed based on a result of a determination as to whether a pressing amount smoothed by the smoothing processing unit reaches the second threshold value when the touch time is not longer than the predetermined value.

3. The pressing operation detection device according to claim 1, wherein the determination controller sets a first threshold value for the pressing operation determination unit when the touch time detected by the touch time detection unit is longer than a predetermined value and sets a second threshold value which is smaller than the first threshold value for the pressing operation determination unit when the touch time is not longer than the predetermined value, so as to change content of a determination process to be performed by the pressing operation determination unit, and wherein the pressing operation determination unit determines whether a pressing operation has been performed based on a result of a determination as to whether a pressing amount smoothed by the smoothing processing unit reaches the first threshold value when the touch time is longer than the predetermined value and determines whether a pressing operation has been performed based on a result of a determination as to whether a pressing amount detected by the pressing amount detection unit reaches the second threshold value when the touch time is not longer than the predetermined value.

4. A pressing operation detection method employed in a pressing operation detection device which detects a touch on an operation unit performed by a user and which detects a pressing amount of pressing on the operation unit performed by the user, the pressing operation detection method comprising:

detecting a touch on the operation unit performed by the user using a touch detection unit of the pressing operation detection device;

detecting a pressing amount of pressing on the operation unit performed by the user using a pressing amount detection unit of the pressing operation detection device;

detecting a touch time which is an elapsed time in which a touch on the operation unit performed by the user is continued from a start of the touch using a touch time detection unit of the pressing operation detection device;

changing content of a determination process to be performed by a pressing operation determination unit such that detection of a pressing operation is changed in accordance with the touch time detected by the touch time detection unit using a determination controller of the pressing operation detection device; and determining whether a pressing operation has been performed on the operation unit based on a result of a determination as to whether the pressing amount reaches a threshold value in accordance with content of a determination process controlled by the determination controller using the pressing operation determination unit of the pressing operation detection device;

wherein the determination controller changes content of the determination process to be performed by the pressing operation determination unit such that the determination as to whether a pressing operation has been performed is made using a pressing amount smoothed by a smoothing processing unit when the touch time detected by the touch time detection unit is longer than a predetermined value, whereas the determination as to whether a pressing operation has been performed is made using a pressing amount detected by the pressing amount detection unit when the touch time is not longer than the predetermined value, and wherein the pressing operation determination unit determines whether a pressing operation has been performed based on a result of a determination as to whether a pressing amount smoothed by the smoothing processing unit reaches a threshold value when the touch time is longer than the predetermined value, whereas the pressing operation determination unit determines whether a pressing operation has been performed based on a result of a determination as to whether a pressing amount detected by the pressing amount detection unit reaches the threshold value when the touch time is not longer than the predetermined value.

5. The pressing operation determination method according to claim 4, wherein the determination controller sets a first threshold value for the pressing operation determination unit when the touch time detected by the touch time detection unit is longer than a predetermined value and sets a second threshold value which is smaller than the first threshold value for the pressing operation determination unit when the touch time is not longer than the predetermined value, so as to change content of a determination process to be performed by the pressing operation determination unit, and wherein the pressing operation determination section determines whether a pressing operation has been performed based on a result of a determination as to whether a pressing amount smoothed by a smoothing processing unit reaches the first threshold value when the touch time is longer than the predetermined value and determines whether a pressing operation has been performed based on a result of a determination as to whether a pressing amount smoothed by the smoothing processing unit reaches the second threshold value when the touch time is not longer than the predetermined value.

6. The pressing operation detection method according to claim 4, wherein the determination controller sets a first threshold value for the pressing operation determination unit when the touch time detected by the touch time detection unit is longer than a predetermined value and sets a second threshold value which is smaller than the first threshold value for the pressing operation determination unit when the touch time is not longer than the predetermined value, so as to change content of a determination process to be performed by the pressing operation determination unit, and wherein the pressing operation determination unit determines whether a pressing operation has been performed based on a result of a determination as to whether a pressing amount smoothed by a smoothing processing unit reaches the first threshold value when the touch time is longer than the predetermined value and determines whether a pressing operation has been performed based on a result of a determination as to whether a pressing amount detected by the pressing amount detection unit reaches the second threshold value when the touch time is not longer than the predetermined value.

7. A pressing operation detection method employed in a pressing operation detection device which detects a touch on an operation unit performed by a user and which detects a pressing amount of pressing on the operation unit performed by the user, the pressing operation detection method comprising:

performing a smoothing process on pressing amounts successively detected;

determining whether a pressing operation has been performed on the operation unit based on a detected touch on the operation unit and a detected pressing amount;

detecting a touch time which is an elapsed time in which a detected touch by the user is continued from start of the touch;

changing content of the determination process to be performed such that the determination as to whether a pressing operation has been performed is made using a pressing amount smoothed by the smoothing process when the detected touch time is longer than a predetermined value, whereas the determination as to whether a pressing operation has been performed is made using the detected pressing amount when the touch time is not longer than the predetermined value, and determining whether a pressing operation has been performed based on a result of a determination as to whether a pressing amount smoothed by the smoothing process reaches a threshold value when the touch time is longer than the predetermined value, and determining whether a pressing operation has been performed based on a result of a determination as to whether the detected pressing amount reaches the threshold value when the touch time is not longer than the predetermined value.

8. The pressing operation determination method according to claim 7, further comprising:

setting a first threshold value for the pressing operation determination when the detected touch time is longer than a predetermined value and setting a second threshold value which is smaller than the first threshold value for the pressing operation determination when the detected touch time is not longer than the predetermined value, so as to change content of the pressing operation determination, and determining whether a pressing operation has been performed based on a result of a determination as to whether a pressing amount smoothed by the smoothing process reaches the first threshold value when the touch time is longer than the predetermined value, and determining whether a pressing operation has been performed based on a result of a determination as to whether a pressing amount smoothed by the smoothing process reaches the second threshold value when the touch time is not longer than the predetermined value.

9. The pressing operation detection method according to claim 7, further comprising:

setting a first threshold value for the pressing operation determination when the detected touch time is longer than a predetermined value and setting a second threshold value which is smaller than the first threshold value for the pressing operation determination when the touch time is not longer than the predetermined value, so as to change content of the pressing operation determination, and determining whether a pressing operation has been performed based on a result of a determination as to whether a pressing amount smoothed by the smoothing process reaches the first threshold value when the touch time is longer than the predetermined value and determining whether a pressing operation has been performed based on a result of a determination as to whether the detected pressing amount reaches the second threshold value when the touch time is not longer than the predetermined value.

* * * * *